(12) United States Patent
Stahmann et al.

(10) Patent No.: US 6,224,932 B1
(45) Date of Patent: May 1, 2001

(54) CRYOGENIC RHEOLOGICAL MODIFICATION OF TREE NUTS

(75) Inventors: William J. Stahmann; William W. Bivens, Jr.; Sally Stahmann Rovirosa, all of San Miguel, NM (US)

(73) Assignee: Stahmann Farms, Inc., San Miguel, NM (US)

( * ) Notice: Subject to any disclaimer, the term of this patent is extended or adjusted under 35 U.S.C. 154(b) by 0 days.

(21) Appl. No.: 09/308,706

(22) PCT Filed: Sep. 25, 1998

(86) PCT No.: PCT/US98/20012

§ 371 Date: Jul. 28, 1999

§ 102(e) Date: Jul. 28, 1999

(87) PCT Pub. No.: WO99/15843

PCT Pub. Date: Apr. 1, 1999

Related U.S. Application Data
(60) Provisional application No. 60/060,163, filed on Sep. 25, 1997.

(51) Int. Cl.[7] .............................. A23L 1/36; F25D 17/02; F25D 25/00
(52) U.S. Cl. ........................ 426/479; 426/480; 426/482; 62/62; 62/63; 62/64; 62/373; 62/374
(58) Field of Search ..................... 426/479, 480, 426/482; 62/62, 63, 64, 373, 374

(56) References Cited

U.S. PATENT DOCUMENTS

| | | |
|---|---|---|
| 3,214,928 | 11/1965 | Oberdorfer . |
| 3,413,818 | 12/1968 | Pelmulder . |
| 3,452,936 | 7/1969 | Hanser et al. . |
| 4,004,037 | 1/1977 | Connick . |
| 4,177,296 | 12/1979 | Mochizuki et al. . |
| 4,436,757 | 3/1984 | Lange et al. . |
| 4,742,686 | 5/1988 | Cook . |
| 4,992,289 | 2/1991 | Kiczek . |
| 5,059,151 | 10/1991 | Kiczek . |
| 5,333,802 | 8/1994 | Seelig et al. . |

*Primary Examiner*—Anthony J. Weier
(74) *Attorney, Agent, or Firm*—Jeffrey D. Myers; Brian J. Pangrle

(57) ABSTRACT

A method and apparatus for cryogenic rheological modification of tree nuts and other shelled foodstuffs wherein brief cryogenic exposure facilitates further processing, particular shell removal. Nuts from a bin (12) of conditioned nuts are transported by a conveyor (14) to a cryogenic dip (16). The nuts are then conveyed by a conveyor (18) to a cracker feeder chain (20) to a cracker unit (22).

30 Claims, 1 Drawing Sheet

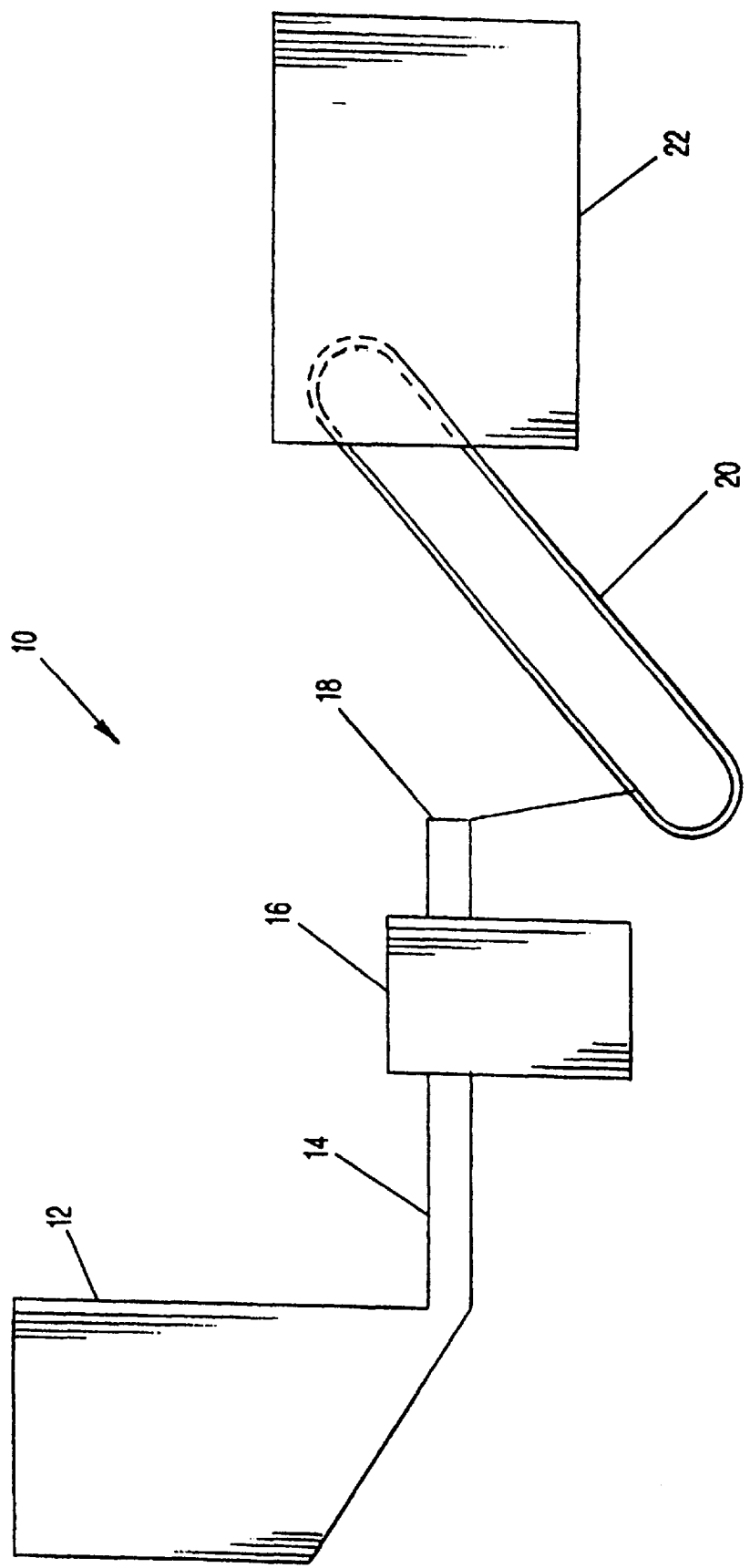

CRYOGENIC RHEOLOGICAL MODIFICATION OF TREE NUTS

CROSS-REFERENCE TO RELATED APPLICATIONS

This application claims the benefit of the filing of U.S. Provisional patent application Ser. No. 60/060,163, entitled "Method and process to improve the cracking of tree nutshells", to Stahmann, filed on Sep. 25, 1997, and the specification thereof is incorporated herein by reference.

BACKGROUND OF THE INVENTION

1. Field of the Invention (Technical Field)

The present invention relates to selective modification of rheological properties of foodstuffs to enhance processing. More specifically, the present invention enhances tree nutshell fracturing processes by contacting tree nuts with a cryogen.

2. Background Art

Food processing generally adds value to raw or commodity foodstuffs. Often raw foodstuffs must be ground, milled, fractured or crushed to produce a final marketable product. Rheological properties of foodstuffs govern the selection and ultimately the efficiency of such processes. Rheological properties determine how materials flow or deform. For instance, hydration typically reduces the Young's modulus (a parameter used to help characterize the relationship between stress and strain) and yield stress of foodstuffs like starch grains. A reduced Young's modulus corresponds to an increase in strain for a given amount of applied stress whereas a reduced yield stress means that the foodstuff will fracture or shear at a reduced applied stress. High levels of hydration may minimize or even eliminate fracturing, in such instances, the yield stress corresponds to shearing or the point where the applied stress causes the foodstuff to flow. Other processes such as freezing affect the rheological properties of foodstuffs differently. Freezing usually increases the Young's modulus; however, the yield stress may increase or decrease depending on the physical structure of the foodstuff. In the case of foodstuffs with a substantial water activity, the time-temperature curve, i.e., the rate of cooling, often determines crystal size. For example, slow freezing produces larger crystals whereas rapid freezing produces smaller crystals, Furthermore, slow freezing segregates soluble materials more so than rapid freezing. Although frozen foodstuffs almost always have a higher Young's modulus, those with larger crystals frequently fracture differently than those with smaller crystals. To facilitate fracturing, a high Young's modulus and a lower yield stress are desirable.

The following U.S. Patents disclose methods for cooling foodstuffs using cryogens: U.S. Pat. No. 5,333,802, entitled "Method and apparatus for producing chunks or kibbles of a foodstuff," to Seelig et al., discloses use of a liquid cryogen to alter rheological properties of foodstuffs prior to chunking or kibbling. U.S. Pat. No. 4,742,686, entitled "Process for increasing tree nut shelling efficiency," to Cook, discloses use of a cryogen to freeze tree nuts whereby nut kernals become harder than nutshells. U.S. Pat. No. 4,436,757, entitled "Cryogenic process for decortication and hulling of sunflower seeds," to Lange et al., discloses use of cryogen diffusion into sunflower seeds followed by rapid heating to cause gas expansion and hull separation. U.S. Pat. No. 4,177,296. entitled "Process for the preparation of peanut-curd." to Mochizuki et al., discloses cryogenic cooling and pulverizing of pressed peanuts to obtain a peanut-curd. U.S. Pat. No. 4,004,037, entitled "Peanut butter manufacture," to Connick, discloses use of cryogens for preparation of peanut butter in a non-oxidizing, low-temperature environment. U.S. Pat. No. 3,452,936, entitled "Reduction of cereal grains to flour," to Hanser, discloses use of cryogenic conditions for processing cereal grains. U.S. Pat. No. 3,413,818, entitled "Immersion freezing," to Pelmulder, discloses cyrogenic processing of foodstuffs for storage or for subsequent freeze-drying. U.S. Pat. No. 3,214,928, entitled "Method and apparatus for freezing food products," to Oberdorfer, discloses spraying and showering of cryogenic fluids for freezing food products.

SUMMARY OF THE INVENTION
(DISCLOSURE OF THE INVENTION)

The present invention is of a method and apparatus for cryogenic rheological modification of shelled foods comprising: providing a shelled food comprising an exterior shell and interior meat and briefly exposing the shelled food to a cryogen to substantially modify rheology of the exterior shell while substantially leaving rheology of the interior meat unaffected. In the preferred embodiment, the present invention further comprises hydrating the shelled food. Preferably, the preferred embodiment comprises providing, for example, nuts (for example, tree nuts), crustaceans, or mollusks. For hydrating of tree nuts a hydrated moisture content of between approximately 5% by weight and approximately 7% by weight is preferred. Exposing comprises briefly exposing shelled food to a cryogen for a time sufficient to enhance fractureability of the shells. The preferred embodiment additionally comprises modifying after exposing, wherein modifying may be fracturing shells of the shelled foods, shattering shells of the shelled foods, imploding shells of the shelled foods, exploding shells of the shelled foods, or combinations thereof. Modifying preferably occurs within approximately 10 seconds of exposing, employs an applied force at least 10% lower in force than an applied force necessary to modify the shelled foods in the absence of exposure to a cryogen and separates at least approximately 90% of the meats from the corresponding shells. Exposing preferably comprises exposing for less than approximately one minute, more preferably between approximately 3 and 16 seconds, and most preferably between approximately 6 and 15 seconds. Exposing also preferably comprises briefly exposing the shelled food to a cryogen having a temperature of at least 100 degrees Fahrenheit lower than a temperature of the shelled food and more preferably of at least 200 degrees Fahrenheit lower.

A primary object of the present invention is to selectively modify rheological properties of foodstuffs to enhance food processing.

A primary advantage of the present invention is enhanced processing of tree nuts whereby more intact nutmeats are recovered.

Other objects, advantages and novel features, and further scope of applicability of the present invention will be set forth in part in the detailed description to follow, and in part will become apparent to those skilled in the art upon examination of the following, or may be learned by practice of the invention. The objects and advantages of the invention may be realized and attained by means of the instrumentalities and combinations particularly pointed out in the appended claims.

BRIEF DESCRIPTION OF THE DRAWINGS

The accompanying drawing, which is incorporated into and forms a part of the specification, illustrates an embodiment of the present invention and, together with the description, serves to explain the principles of the invention. The drawing is only for the purpose of illustrating a preferred embodiment of the invention and is not to be construed as limiting the invention. In the drawing:

FIG. 1 is a block diagram of the preferred embodiment of the present invention.

DESCRIPTION OF THE PREFERRED EMBODIMENTS (BEST MODES FOR CARRYING OUT THE INVENTION)

The present invention selectively manipulates rheological properties of foodstuffs. The present invention uses hydration and cryogenic freezing techniques and combinations thereof, to facilitate fracturing of foodstuffs. Foodstuffs, and other matter, with an exterior shell, or husk, and interior meat include nuts, crustaceans and mollusks. In a preferred embodiment, tree nuts are hydrated and then briefly exposed to a cryogenic fluid. The hydration step reduces the Young's modulus of the nut while the cryogenic exposure increases the Young's modulus of the shell while decreasing the shell's yield stress. In this preferred embodiment, fracturing of the shell occurs at less applied stress and with less damage to the nutmeat. Of course, the rate at which the stress is applied to the nutshell is an important factor for fracturing; however, most commercial processes use rates that are sufficiently such that discussion of this factor is of diminished importance.

In general, for fracturing of tree nutshells, the present invention uses a three step process. The first step hydrates the nutmeat, typically to a moisture content of between 5% by weight and 7% by weight. This step also increases the water content of the shell. The next step uses a cryogenic fluid to freeze water entrained in the shell. The period of contact between the shell and the cryogenic fluid is brief, e.g., less than one minute, such that the nut does not freeze. The third step, fracturing, follows immediately to ensure that the temperature of the shell has not risen substantially.

To achieve a fast freeze of the shell, the freezing step uses a high temperature differential between the nut and the cryogen, e.g., greater than 100° F. Suitable cryogens include, but are not limited to, for example, liquid nitrogen (boiling point at −320° F.), liquid oxygen (boiling point at −297° F.), liquid helium (boiling point at −451° F.), and solid carbon dioxide (sublimation point at −109° F.). When the temperature of the shell is above 0° F., solid carbon dioxide produces a temperature differential greater than approximately 100° F., liquid oxygen produces a temperature differential greater than approximately 200° F., and liquid nitrogen produces a temperature differential greater than approximately 300° F. In most instances, the cryogenic fluid or solid contacts the foodstuff directly, however, intermediate heat transfer media may also be used. For direct cryogenic contact with, for example, a nutshell, heat energy is transferred from the shell to the cryogen. For cryogenic fluids, at first, the fluid surrounding the shell may vaporize and form a vapor layer around the shell, i.e., the Leidenfrost effect. Typically, the vapor layer reduces the heat transfer coefficient; however, as the shell surface temperature drops, the Leidenfrost effect dissipates and quick cooling results. For some tree nuts, a small gas layer may exist between the shell and the nutmeat. This gas layer typically has a poorer heat transfer coefficient than the shell and thus further protects the nutmeat from freezing (the heat transfer coefficient of the nutmeat and shed also differ and depend on factors such as water activity and fat content). Upon hydration, however, such a gas space may become filled with water thereby increasing heat transfer from the nutmeat. This seemingly detrimental effect is balanced by the ability to freeze or supercool the interior water. In most circumstances, water density decreases upon freezing thereby causing the water to expand when frozen. The expanded frozen water exerts a force on the nutshell; this force may aid the overall shell removal process. Supercooled water, liquid water at a temperature below the freezing point, freezes quickly when disturbed or when given an impetus to crystallize, for example, a drop in pressure or starting point for crystal formation. Again, expansion of the water upon freezing will exert an outward force on the nutshell and aid the overall shell removal process.

The following three steps are of a preferred embodiment of the present invention. The first step conditions nuts by exposing them to a wet environment to raise the "free" water content in the nutmeat to between 5% by weight and 7% by weight and at the same time entrain moisture in the shell. When moist, the nutmeat is pliable and will not shatter when the shell is fractured or cracked. In the second step, the nuts are exposed to a cryogen for a period of preferably from approximately 3 seconds to approximately 16 seconds, and most preferably from approximately 6 seconds to approximately 15 seconds depending on the size of the nut and the thickness of the shell. When liquid nitrogen is used, the freezing process brings the shell temperature to around approximately −320° F. where the shell becomes very brittle but the nutmeat remains pliable. The nuts are transferred to the cracker immediately after exposure to the cryogen, e.g., within 10 seconds, and cracked with a strike force reduced by approximately 10% to approximately 25% of the normal strike force. The strike force is a force applied to the shell surface and when expressed over the surface area, it represents an applied stress or pressure. The reduced strike force also contributes to fewer damaged nutmeats, more whole nutmeats and more undamaged halves in the case of nuts like pecans. Furthermore, brittle shells shatter and fall away more completely than in conventional processes. Thus, the need for a shelling process to separate nutmeats from shells is reduced (shelling processes often damage the nutmeats). In many instances, approximately 90% of the product can bypass the shelling process through use of the present invention. Overall, the invention results in more wholes or whole halves, fewer pieces and less milling loss.

In addition to or as a substitute for applied mechanical forces, applied forces in the form of, for example, liquid jets and air jets may be used. Similarly, reductions in pressure or increases in pressure may be used. A drop in pressure may cause the shell to explode while an increase in pressure may cause the shell to implode. Techniques using supercritical transitions, for example, supercritical carbon dioxide techniques, are also embodied in the present invention and may serve to both cool and/or fracture shells.

FIG. 1 illustrated the preferred apparatus of the invention 10. Nuts from bin 12 of conditioned nuts are transported by conveyor 14 to cryogenic dip 16. The nuts are then conveyed by conveyor 18 to cracker feeder chain 20 to cracker unit 22.

The present invention may be used with traditional methods of food processing. For instance, some milling processes use chemicals such as sodium hydroxide or sulfur dioxide to enhance hydration. The addition of such chemicals speeds the rate of hydration and can reduce processing times drastically. The first step of the present invention is designed to accommodate alternative steeping or hydration processes. Regardless of the specific nature of the first step, the present invention has an advantage in that the freezing step is fast and therefore unlikely to be the rate-limiting step.

Although the invention has been described in detail with particular reference to these preferred embodiments, other embodiments can achieve the same results. Variations and modifications of the present invention will be obvious to those skilled in the art and it is intended to cover in the appended claims all such modifications and equivalents. The entire disclosures of all references, applications, patents, and publications cited above are hereby incorporated by reference.

What is claimed is:

1. A method of cryogenic rheological modification of shelled foods, the method comprising the steps of:

providing a shelled food comprising an exterior shell and interior meat;

hydrating the shelled food; and briefly exposing the shelled food to a cryogen to substantially modify rheology of the exterior shell while substantially leaving rheology of the interior meat unaffected.

2. The method of claim 1 wherein the providing step comprises providing nuts.

3. The method of claim 2 wherein the providing step comprises providing tree nuts.

4. The method of claim 3 wherein the hydrating step comprises hydrating the tree nuts to a moisture content of between approximately 5% by weight and approximately 7% by weight.

5. The method of claim 1 wherein the providing step comprises providing shelled food selected from the group consisting of nuts, crustaceans, and mollusks.

6. The method of claim 1 wherein the exposing step composes briefly exposing the shelled food to a cryogen for a time sufficient to enhance fractureability of the shells.

7. The method of claim 1 additionally comprising a modifying step after the exposing step selected from the group consisting of fracturing shells of the shelled foods, shattering shells of the shelled foods, imploding shells of the shelled foods, and exploding shells of the shelled foods.

8. The method of claim 7 wherein the modifying step occurs within approximately 10 seconds of the exposing step.

9. The method of claim 7 wherein the modifying step comprises employing an applied force at least 10% lower in force than an applied force necessary to modify the shelled foods in the absence of exposure to a cryogen.

10. The method of claim 7 wherein the modifying step comprises separating at least approximately 90% of the meats from the corresponding shells.

11. The method of claim 1 wherein the exposing step comprises exposing for less than approximately one minute.

12. The method of claim 11 wherein the exposing step comprises exposing for between approximately 3 and 16 seconds.

13. The method of claim 12 wherein the exposing step comprises exposing for between approximately 6 and 15 seconds.

14. The method of claim 1 wherein the exposing step comprises briefly exposing the shelled food to a cryogen having a temperature of at least 100 degrees Fahrenheit lower than a temperature of the shelled food.

15. The method of claim 14 wherein the exposing step comprises briefly exposing the shelled food to a cryogen having a temperature of at least 200 degrees Fahrenheit lower than a temperature of the shelled food.

16. An apparatus for cryogenic rheological modification of shelled foods, the apparatus comprising:

means for providing a shelled food comprising an exterior shell and interior meat;

means for hydrating the shelled food; and means for briefly exposing the shelled food to at least one cryogen to substantially modify rheology of the exterior shell while substantially leaving rheology of the interior meat unaffected.

17. The apparatus of claim 16 wherein the shelled food comprises nuts.

18. The apparatus of claim 17 wherein the shelled food comprises tree nuts.

19. The apparatus of claim 18 wherein the means for hydrating comprises hydrating the tree nuts to a moisture content of between approximately 5% by weight and approximately 7% by weight.

20. The apparatus of claim 16 wherein the shelled food comprises a member selected from the group consisting of nuts, crustaceans, and mollusks.

21. The apparatus of claim 16 where in the means for exposing comprises means for briefly exposing the shelled food to a cryogen for a time sufficient to enhance fractureability of the shells.

22. The apparatus of claim 16 additionally comprising modifying means selected from the group consisting of means for fracturing shells of the shelled foods, means for shattering shells of the shelled foods, means for imploding shells of the shelled foods, and means for exploding shells of the shelled foods.

23. The apparatus of claim 22 wherein the modifying means operates within approximately 10 seconds of the exposing step.

24. The apparatus of claim 22 wherein the modifying means comprises employing an applied force at least 10% lower in force than an applied force necessary to modify the shelled foods in the absence of exposure to a cryogen.

25. The apparatus of claim 22 wherein the modifying means comprises separating at least approximately 90% of the meats from the corresponding shells.

26. The apparatus of claim 16 wherein the means for exposing comprises means for exposing for less than approximately one minute.

27. The apparatus of claim 26 wherein the means for exposing comprises means for exposing for between approximately 3 and 16 seconds.

28. The apparatus of claim 27 wherein the means for exposing comprises means for exposing for between approximately 6 and 15 seconds.

29. The apparatus of claim 16 wherein the means for exposing comprises means for briefly exposing the shelled food to a cryogen having a temperature of at least 100 degrees Fahrenheit lower than a temperature of the shelled food.

30. The apparatus of claim 29 wherein the means for exposing comprises means for briefly exposing the shelled food to a cryogen having a temperature of at least 200 degrees Fahrenheit lower than a temperature of the shelled food.

* * * * *